United States Patent
Yablon

(10) Patent No.: US 6,767,144 B2
(45) Date of Patent: Jul. 27, 2004

(54) SYSTEMS AND METHODS FOR REDUCING SPLICE LOSS IN OPTICAL FIBERS

(75) Inventor: Andrew D. Yablon, Livingston, NJ (US)

(73) Assignee: Fitel USA Corp., Norcross, GA (US)

(*) Notice: Subject to any disclaimer, the term of this patent is extended or adjusted under 35 U.S.C. 154(b) by 183 days.

(21) Appl. No.: 10/190,137

(22) Filed: Jul. 3, 2002

(65) Prior Publication Data

US 2004/0005126 A1 Jan. 8, 2004

(51) Int. Cl.[7] .............................................. G02B 6/255
(52) U.S. Cl. .......................... 385/95; 385/96; 385/97; 385/43; 385/33; 385/34; 385/115; 385/48
(58) Field of Search .............................. 385/95, 96, 97, 385/43, 33, 34, 115, 48

(56) References Cited

U.S. PATENT DOCUMENTS 5,408,555 A * 4/1995 Fielding et al. ............... 385/43
6,453,090 B1 * 9/2002 Conde et al. ................. 385/33

* cited by examiner

Primary Examiner—Dean A. Reichard
Assistant Examiner—Jinhee Lee
(74) Attorney, Agent, or Firm—Priest & Goldstein, PLLC

(57) ABSTRACT

Systems and methods are described for reducing splice loss in an optical transmission line. A described system includes fiber guides for holding a first fiber and a second fiber in position for splicing to each other at a splice point. A heat source applies sufficient heat at the splice point to cause the first and second fibers to be fused together at the splice point, and subsequently applied heat to the splice point after the splice has been completed. The system further includes a tensioning assembly for applying a controlled, non-zero tension to the first and second fibers after they have been spliced together.

5 Claims, 6 Drawing Sheets

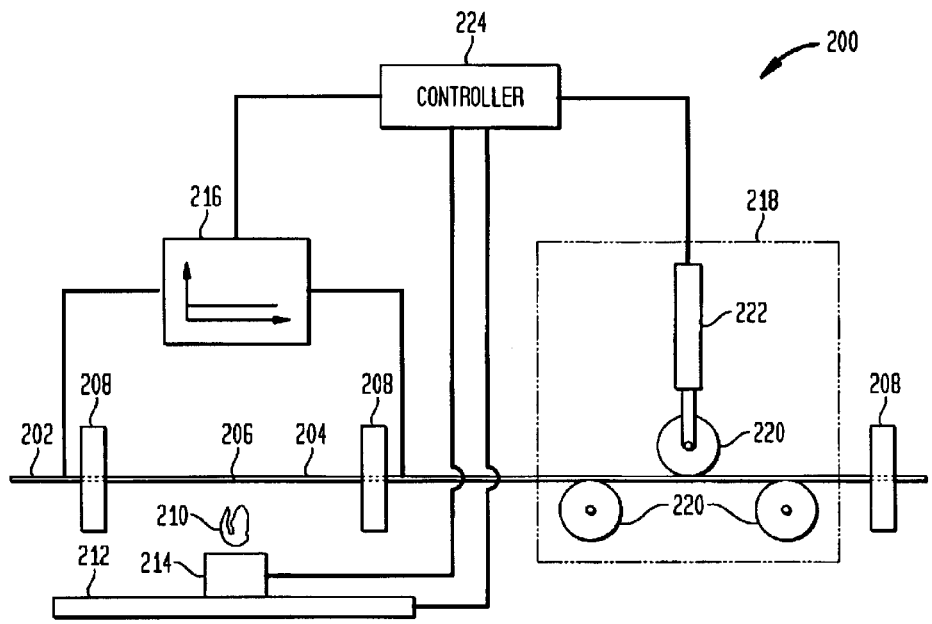

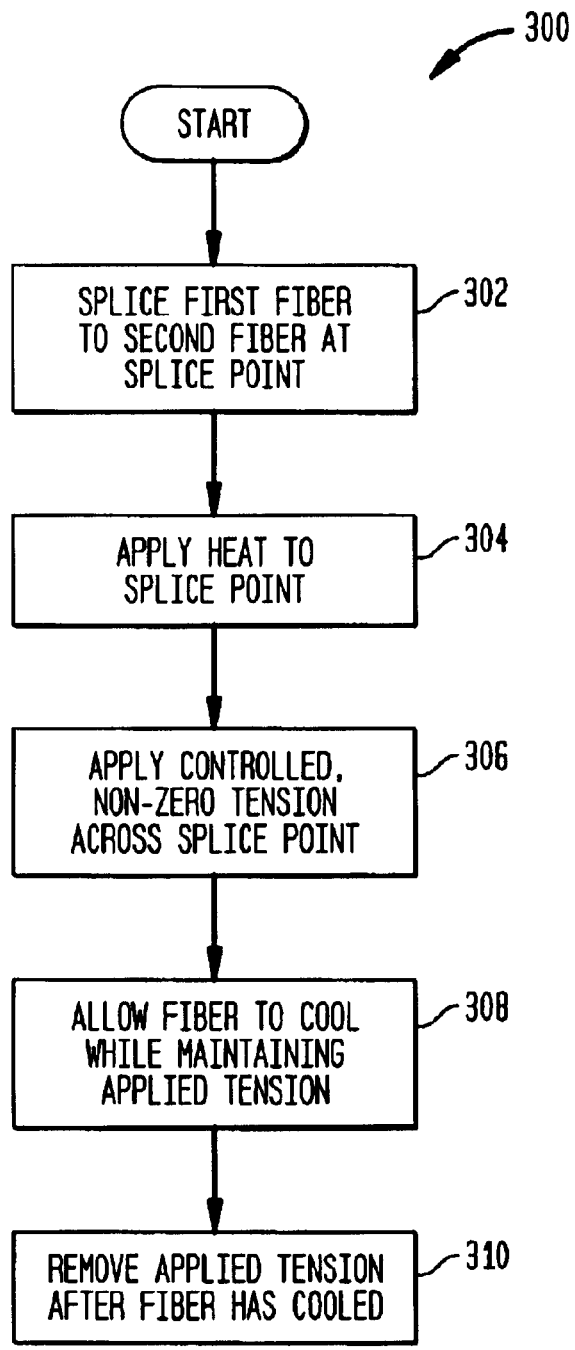

SYSTEMS AND METHODS FOR REDUCING SPLICE LOSS IN OPTICAL FIBERS

BACKGROUND OF THE INVENTION

1. Field of the Invention

The present invention relates generally to the field of fiber optics, and particularly to advantageous aspects of systems and methods for reducing splice loss in optical fibers.

2. Description of Prior Art

Optical fibers are thin strands of glass designed to carry optical signals long distances at high bandwidth. Optical fibers are typically cylindrically symmetric structures, including an inner "core" region and an outer "cladding" region. One or both of these regions are typically doped with various chemicals to alter the glass properties. Modern high performance optical fibers can contain several distinct annular regions each doped with different chemicals at various concentrations.

Optical fiber fusion splicing is important for achieving high quality joints between optical fibers. In this context, quality includes low loss, high strength, and superior long-term reliability. Optical fiber fusion splicing is distinguished from simple mechanical splicing in that in a fusion splice the fiber tips are melted together and form a welded joint. Many different heat sources have been developed for fusion splicing including chemical flames, high intensity laser beams, electric arcs, and resistive filament heaters. There is a wide variety of commercially available optical fiber fusion splicing equipment utilizing these techniques. Many of these commercially available devices can readily achieve in conventional single mode fiber (SMF) splicing having extremely low-loss, <0.02 dB, and high-strength, >100 kpsi proof test. However, the processing conditions required for achieving high-quality optical fiber fusion splices depend upon the fiber design.

Current optical fiber networks, and networks under development, commonly require the use of specialty optical fibers, termed "dispersion-managed fibers," which comprise many distinct annular layers and are strategically deployed in the optical network to control the dispersion of optical signals. Examples of such dispersion-managed fibers include dispersion compensating fiber (DCF) and inverse dispersion fiber (IDF). High performance optical networks require a large number of splices between dispersion-managed optical fibers. For example, in certain applications it is advantageous to alternate relatively short sections (~30 km) of dispersion-managed fibers over a relatively long distances (~1000 km). The large number of splices required for this application places stringent demands on the quality of the optical fiber fusion splices.

Recent experience has demonstrated that it is extremely difficult to achieve low-loss fusion splices between certain high performance dispersion-managed fibers. For example, the fusion splicing processing conditions that would result in less than 0.02 dB of splice loss in standard SMF result in greater than 0.5 dB splice loss when joining DCF or IDF to each other or to SMF. These high splice losses restrict the applications of such dispersion-managed fibers and limit the design possibilities for an optical network since network performance degrades as the number of dispersion managed fiber splices is increased.

There is thus a need for systems and methods for reducing splice loss for these and other types of optical fibers.

SUMMARY OF INVENTION

Aspects of the invention provide systems and methods for reducing splice loss in an optical transmission line. A system according to an aspect of the invention includes fiber guides for holding a first fiber and a second fiber in position for splicing to each other at a splice point. A heat source applies sufficient heat at the splice point to cause the first and second fibers to be fused together at the splice point and subsequently applies heat to the splice point after the splice has been completed. The system further includes a tensioning assembly for applying a controlled, non-zero tension to the first and second fibers after they have been spliced together.

Additional features and advantages of the present invention will become apparent by reference to the following detailed description and accompanying drawings.

BRIEF DESCRIPTION OF DRAWINGS

FIG. 6 shows a diagram of a system for reducing splice loss according to an aspect of the invention.

FIG. 8 shows a flowchart illustrating a method for reducing splice loss according to an aspect of the invention.

DETAILED DESCRIPTION

Aspects of the present invention provide systems and methods for reducing splice loss in optical transmission lines. As mentioned above, high fusion splice losses occur in certain newer fiber designed, including DCF and IDF. However, it is important to note that these high fusion splice losses do not stem from a simple misalignment or some other geometrical distortion in the vicinity of the splice.

Figure 1:
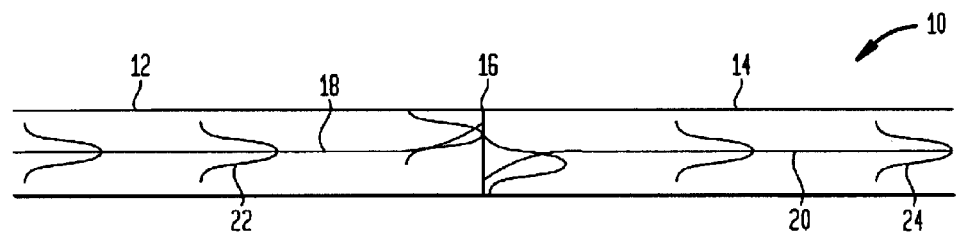
FIGS. 1 through 3 shows diagrams of spliced optical fiber transmission lines illustrating various types of splice loss.

FIG. 1 shows a diagram of an optical transmission line 10 including a first fiber 12 and a second fiber 14 that are spliced together at a splice point 16. Each fiber 12 and 14 has a respective core 18 and 20, and respective modefields represented by a series of Gaussian curves 22 and 24. As illustrated in FIG. 1, splice loss may result from a misalignment of fiber cores 18 and 20 and modefields 22 and 24. However, high splice losses can occur even in cases in which the fiber tips are perfectly aligned, and in which there is no evidence of any mechanical distortion of the waveguide in the vicinity of the splice.

Figure 2:
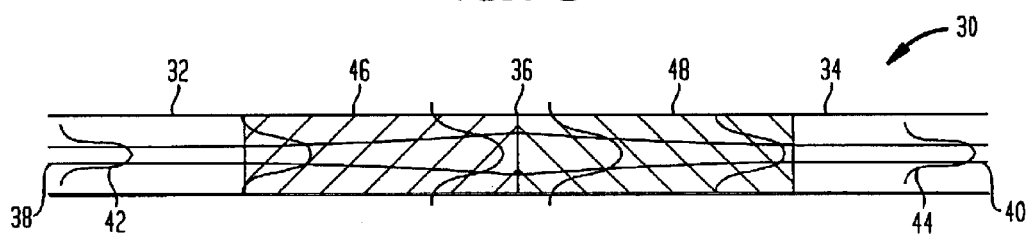

If geometrical distortion is assumed to be negligible, other types of loss can contribute to the loss of an optical fiber fusion splice. A first type of loss, called "transition loss," refers to the loss the optical signal experiences as it travels through a region of heat-affected fiber. FIG. 2 shows a diagram of an optical fiber transmission line 30 illustrating transition loss. Again the transmission line 30 comprises a first fiber 32 spliced to a second fiber 34 at a splicing point 36. Each fiber 32 and 34 includes a respective core 38 and 40 and modefields 42 and 44. As shown in FIG. 2, in this example, the cores 38 and 40 and modefields 42 and 44 are in alignment with each other. However, each of the fibers 32 and 34 includes a respective region 46 and 48, indicated by cross-hatching, that is affected by the heat used to splice the two fibers together. As illustrated in FIG. 2, in each heat-affected region 46 and 48, the respective core regions 38 and 40 are tapered, which may result, for example, from dopant diffusion.

Figure 3:
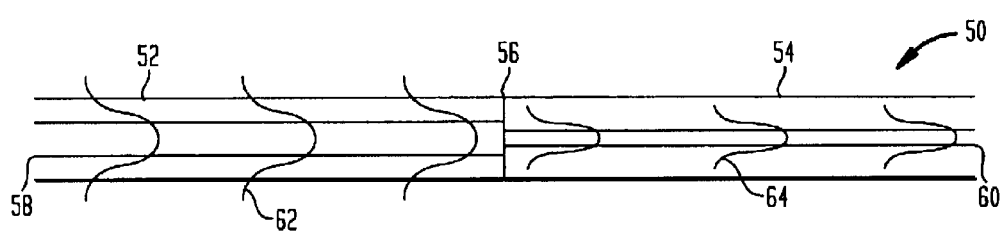

Another type of splice loss, called "overlap loss," refers to the loss that occurs at the splice itself. FIG. 3 is a diagram of an optical fiber transmission line 50 illustrating overlap loss. Again, the transmission line includes a first fiber 52 and a second fiber 54 that are spliced together at a splicing point 56, each of the fibers 52 and 54 including respective core regions 58 and 60 and modefields 62 and 64. As show in FIG. 3, the core region 58 of the first fiber 52 is significantly larger than the core region 60 of the second fiber 54. Thus, overlap loss results from the difference in core diameters.

If the cores of the first and second fibers are properly aligned, and if the heat from the splice process does not alter the fiber tips in any way, then the only possible source for splice loss is overlap loss as illustrated in FIG. 3. If the cores of the first and second fibers are properly aligned, and if the first and second fibers are identical to each other, there can be no overlap loss and any splice loss not attributable to geometric distortion of the fiber can only stem from transition losses within the fiber. The fact that dispersion managed fibers exhibit substantial splice loss in the absence of any detectable geometric distortion, even when spliced to themselves, implicates transition losses as an important source of splice suggests that the heat of the splice process alters the optical fiber tips to create the transition losses.

Figure 4:
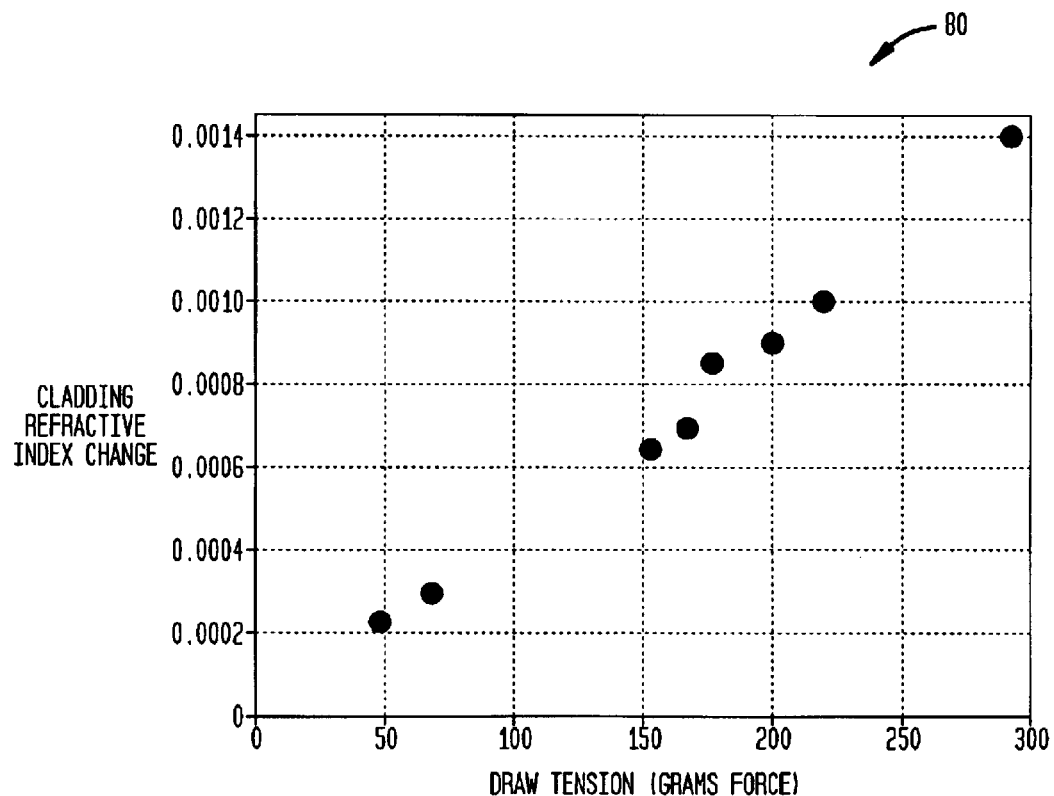
FIG. 4 shows a graph illustrating heat-induced changes in the cladding index of refraction as a function of draw tension.

Measurements of dispersion managed fibers in the vicinity of a splice show that the refractive index of the cladding experiences a substantial change, even when the fiber is heated to temperatures that are not hot enough for splicing. It has been observed that, for a given heating temperature, the amount of change in the refractive index of the fiber cladding is a function of the draw tension of the fiber. FIG. 4 is a graph 80 that illustrates the measured change in the cladding refractive index. This measured data is listed in the tape below:

| Draw Tension | Measured Change in Cladding Refractive Index Following Heating |
|---|---|
| 48 | 0.00022 |
| 68 | 0.00029 |
| 153 | 0.00064 |
| 167 | 0.00069 |
| 177 | 0.00085 |
| 200 | 0.00090 |
| 220 | 0.00100 |
| 293 | 0.00140 |

Splice-induced changes to the fiber's cladding refractive index profile are thought to result from relaxation of viscoelastic strains frozen into the fiber during the fiber draw process. During fiber draw, the highest viscosity region of the fiber, typically the pure-silica cladding, bears the brunt of the draw tension and stretches both elastically (instantaneous deformation) and viscoelastically (time-dependent deformation). The stretching is not volume conserving: the density of the stretched fiber is slightly lower than that of unstretched fiber. The fiber is cooled while under draw tension and then the draw tension is removed. The elastic component of the fiber draw strain relaxes upon tension release but the viscoelastic component cannot: it is frozen into the highest viscosity regions of the fiber. The frozen-in viscoelastic draw strains impart a slightly lower density to the high viscosity regions of the fiber which consequently exhibit a lowered refractive index. Heating the fiber to a temperature near or above its strain point (as occurs in the vicinity of a fusion splice) permits these draw-induced strains to relax so the refractive index in the cladding increases. The strain point of fused silica is about 1,000° C.

Computer models of optical fiber splices predict that the measured refractive index change in the cladding can lead to substantial splice loss and wavelength-dependent splice loss. Wavelength-dependent splice loss refers to a splice loss that varies with wavelength. This wavelength-dependent splice loss can be particularly troublesome for an optical network since it will have a different effect on each optical channel (wavelength). Indeed, experimental and industrial experience confirms that IDF and DCF splices typically exhibit high loss and pronounced wavelength-dependent loss.

Certain types of post-splice heat treatments have been demonstrated to significantly reduce transition and overlap splice losses but these heat treatments can significantly degrade the strength and hence the long-term reliability of the splice. These techniques are predicated on diffusion of the dopants in the fiber to effect an adiabatic modefield transformation. Furthermore, these heat treatments typically require relatively long processing times. These heat treatments may also require the use of a dangerous heat source (i.e. flame or laser) in a production or a field environment.

Another process described in the prior art relies upon stretching an optical fiber in the vicinity of a splice. However, this technique is difficult to implement in practice, it has not been shown to be effective for IDF or DCF, and its primary purpose is to minimize overlap rather than transition splice losses. A variation of this technique relies upon compressing an optical fiber in the vicinity of a splice, or "fattening" of the splice. Once again, this technique is difficult to implement in practice, has not been shown to be effective for IDF or DCF splicing, and its primary purpose is to minimize overlap rather than transition splice losses.

An aspect of the invention provides a post-splice process that significantly reduces both the splice loss and the wavelength dependence of the splice loss in high performance dispersion managed fiber. It is a rapid process that may be readily implemented using commercial splicing equipment. The present invention does not substantially alter the strength or long-term reliability of the splice, while substantially reducing transition losses occurring in the vicinity of an optical fiber splice.

A process according to an aspect of the invention starts with the completion of a fusion splice between a first fiber and a second fiber. Tension is then applied to the completed splice. While the fiber is under tension, a heat source is scanned along the fiber. Alternatively, a wider, stationary heat source may be employed. The tension and the heat may be modulated during the process. After the heat source is removed and the fiber cools, the tension on the fiber is released. The fiber temperature must be kept low enough to suppress plastic deformation during the process. With the proper tension and heating conditions, the splice loss and the wavelength dependent splice loss may be substantially reduced or even eliminated.

A specific example of the present invention is now described. Two Inverse Dispersion Fibers (IDF) fiber tips may be stripped, cleaned, and cleaved according to standard fusion splicing procedure. The fibers are spliced on a Vytran FFS-2000 Filament Fusion Splicer with the following splice parameters:

splice power 17 W
hot push distance 13 microns
hot push delay 350 ms
hot push velocity 700 steps/second splice time 2.5 seconds
prepush 5 microns
argon flow 0.65 liters/minute
pregap 8 microns
no fire polish The fiber holding block cleave tension is set to about 200 grams force. Once the splice is completed, the fiber clamps are released and the fiber holding blocks are manually compressed together (without moving the fibers) and the fiber clamps are closed onto the fiber once again. This applies about 200 grams tension to the fibers. Using a macro, the filament is now scanned across the entire heat-affected splice zone at a speed of about 320 microns/second at a power of about 12 W with an argon flow of about 0.65 liters/minute.

Figure 5:
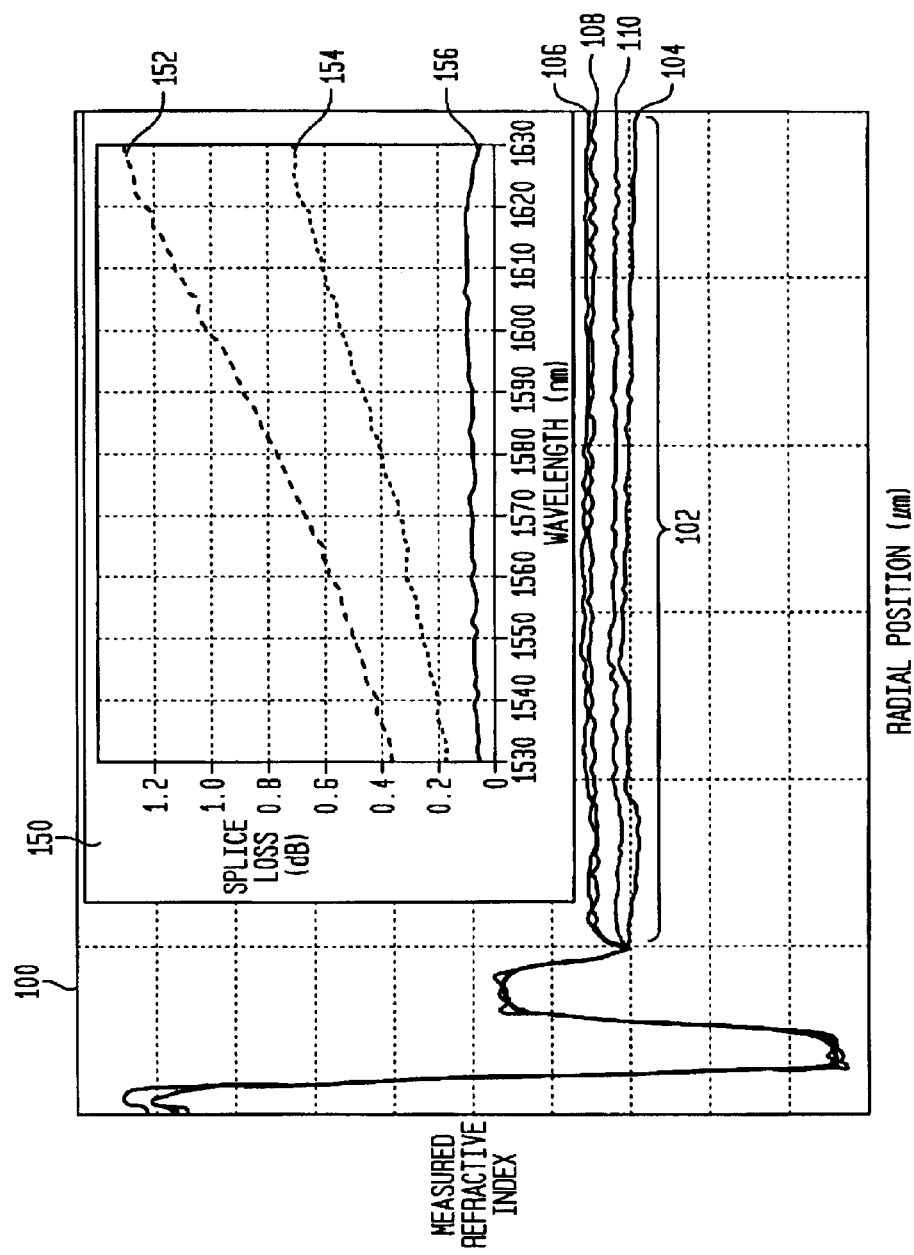
FIG. 5 shows a graph showing experimental results illustrating the effectiveness of using applied tension to reduce splice loss in accordance with an aspect of the invention.

FIG. 5 shows a pair of graphs 100 and 150 plotting experimental results obtained with the processing conditions listed above that illustrate the effectiveness of the invention. For the purposes of illustration, the FIG. 5 graphs 100 and 150 illustrate changes in refractive index and splice loss that occur when an optical fiber is spliced to itself. Because the two spliced fibers are identical, there are no overlap losses, and because none of the fibers exhibited any detectable distortion of the waveguide, the only losses are transition losses.

The larger graph 100 maps refractive index near the splice against radial position. As shown in FIG. 5, because of the particular fibers that have been spliced together, in graph 100 the refractive index changes occur primarily in a region 102 of the graph corresponding to the cladding region of the fibers. The bottom trace 104 shows the original refractive index of the fiber, prior to splicing. The top trace 106 shows the refractive index of the spliced fiber, prior to any post-splice processing. The second trace 108, immediately under the top trace 106, shows the refractive index of the spliced fiber when the spliced fiber is heated in the absence of applied tension. The third trace 110, between the second trace 108 and the original trace 104, shows the refractive index of the fiber after post-splice heat and tension have been applied to the spliced fiber in accordance with the present invention.

The inset graph 150 maps splice loss, in decibels, against signal wavelength. The top trace 152 (dashed) illustrates splice loss prior to post-splice processing. The second trace 154 (dotted) illustrates splice loss when the spliced fiber is heated in the absence of applied tension. The bottom trace 156 (solid) illustrates splice loss after post-splice heat and tension have been applied to the spliced fiber in accordance with the present invention.

FIG. 5 clearly shows that the refractive index of the spliced fiber without any post-splice treatment, trace 106, is markedly different from the original fiber refractive index profile, trace 104. The splices treated with heat but no tension experience a small change in their refractive index profile, trace 108, which brings them closer to the original refractive index profile of the original fiber, trace 104, and this may be partly responsible for the observed benefit in splice loss. The refractive index of the splices treated with both heat and tension, trace 110, are very close to the original refractive index profile, trace 104, and the splice loss and its wavelength dependence are substantially reduced.

It should be noted that the tension effects are reversible. Thus, in graph 100, the second trace 108 may be changed into the third trace 110 by applying heat and tension, and the third trace 110 may be changed back into the second trace by applying heat in the absence of tension. Similar changes may be observed in graph 150 between the second trace 154 (dotted) and the third trace 156 (solid).

FIG. 6 shows a diagram of a system 200 for reducing splice loss according to an aspect of the invention. In FIG. 6, the system 200 is used to splice together a first fiber 202 and a second fiber 204 at a splice point 206. The system 200 includes a plurality of fiber guides 208 for holding the first and second fibers 204 and 206 in position for splicing.

As mentioned above, the splicing operation is accomplished by using a heat source 210 to apply sufficient heat to the splice point 206 to cause the ends of the first and second fibers 202 and 204 to become fused together. In addition, to provide for a smooth transition across the splice point 206, heat may be applied to either side of the splice point 206. This may be accomplished, for example, by using a suitably wide heat source 210. Alternatively, as shown in FIG. 6, the heat source 210 may be mounted to a translation stage 212 that allows the heat source 210 to be scanned down the length of the first and second fibers 202 and 204 in the vicinity of the splice point 206. In addition, the system may include a suitable mechanism 214 for adjusting the intensity of the heat applied to the first and second fibers 202 and 204. The system further includes a tester 216 for monitoring splice loss across the splice point 206.

The system 200 further includes a mechanism 218 for applying tension to the first and second fibers 202 and 204 after they have been spliced together. The mechanism includes a series of guide rollers 220, each roller 220 having a radius sufficiently large to prevent damage to an optical fiber. Tension is applied to an optical fiber through the use of a piston assembly 222. However, other techniques may be used to apply tension without departing from the spirit of the invention.

According to a further aspect of the invention, a microprocessor controller 224 is used to control the various components of the system 200, including the intensity and position of the heat source 210, and tension applied to the first and second fibers 202 and 204. The controller 224 also monitors splice loss through the tester 216, which provides feedback.

Figure 7A:
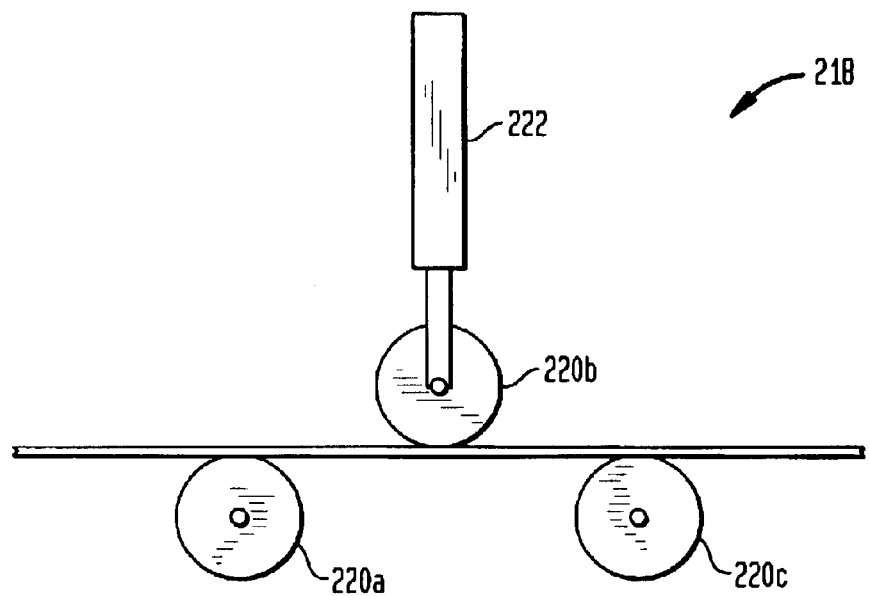
FIG. 7 shows a diagram of a tensioning assembly suitable for use in the system shown in FIG. 6.
Figure 7B:
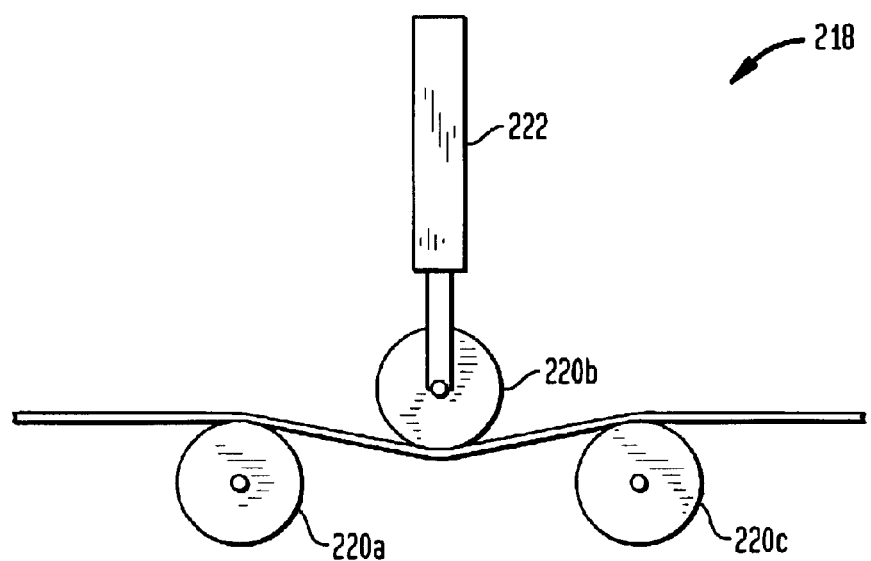

FIGS. 7A and 7B show diagrams illustrating the operation of the tensioning mechanism 218 shown in FIG. 6. In FIG. 7A, the fiber 204 passes through the guide rollers 220a–c without applied tension. In FIG. 7B, the piston mechanism 222 has been actuated, causing the central guide roller 220b to be urged against the fiber 204, thus introducing a controlled, non-zero tension into the spliced fibers 202 and 204. As mentioned above, according to a further aspect of the invention tensioning mechanism may provide for adjustment or modulation of the fiber tension during the splicing process.

The tensioning assembly 218 may be implemented as part of a single unit with the other components illustrated in FIG. 6. Alternatively, the tensioning assembly 218 may be implemented as a separate unit that operates in conjunction with the other components illustrated in FIG. 6. For example, it would be within the spirit of the invention to create a tensioning assembly 218 that could be used in conjunction with a standard fusion splicer. In that case, the tensioning assembly may suitably include a mounting arrangement for attaching the tensioning assembly 218 to the splicer.

FIG. 8 shows a flowchart of a method 300 according to the invention. In step 302, a first fiber and a second fiber are fusion spliced together at a splice point. In step 304, once the fibers have been spliced together, the region of the transmission line proximate to the splice point is heated to a temperature that is sufficiently high to reduce transmission loss, but low enough so that there is minimal plastic deformation of the fiber. In step 306, tension is then applied to the splice, producing a further decrease in transmission loss. If desired, the amount of applied heat and/or the amount of applied tension may be adjusted to adjust the amount of splice loss. In step 308, the heat source is removed from the splice point, and the spliced fiber is allowed to cool while the tension is maintained. Finally, in step 310, the applied tension is removed from the fiber.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A method for reducing splice loss in optical fiber, comprising:

(a) using a fusion splicer to create a splice between a first fiber to a second fiber;

(b) applying a controlled, non-zero tension across the splice;

(c) heating the splice using a heat source to a temperature high enough to cause a reduction of splice loss but low enough to suppress plastic deformation of the first and second fibers;

(d) removing the heat source;

(e) allowing the splice to cool;

(f) releasing the tension.

2. The method of claim 1, wherein step (c) includes scanning the heat source along the optical fiber.

3. The method of claim 1, wherein said heat source is a stationary heat source applied in the region of the splice.

4. The method of claim 1, wherein step (b) includes modulating the amount of tension.

5. The method of claim 1, wherein step (c) includes modulating the amount of heat applied to the splice by said heat source.

* * * * *